(12) United States Patent
Peterson et al.

(10) Patent No.: US 7,496,719 B2
(45) Date of Patent: Feb. 24, 2009

(54) UNIVERSAL NONVOLATILE MEMORY BOOT MODE

(75) Inventors: Steven Peterson, Sacramento, CA (US); Geoffrey Gould, El Dorado Hills, CA (US); Lee Hayashida, Loomis, CA (US)

(73) Assignee: Intel Corporation, Santa Clara, CA (US)

( * ) Notice: Subject to any disclaimer, the term of this patent is extended or adjusted under 35 U.S.C. 154(b) by 248 days.

(21) Appl. No.: 11/189,448

(22) Filed: Jul. 26, 2005

(65) Prior Publication Data

US 2007/0028031 A1  Feb. 1, 2007

(51) Int. Cl.
*G06F 12/22* (2006.01)
(52) U.S. Cl. ..................................... 711/154; 711/172
(58) Field of Classification Search .................. 711/154
See application file for complete search history.

(56) References Cited

U.S. PATENT DOCUMENTS

| | | | | |
|---|---|---|---|---|
| 6,823,435 | B1* | 11/2004 | Wisor | 711/170 |
| 7,296,143 | B2* | 11/2007 | Gaskins et al. | 713/2 |
| 7,302,517 | B2* | 11/2007 | Lim et al. | 711/103 |
| 2004/0172499 | A1* | 9/2004 | Roohparvar | 711/103 |

OTHER PUBLICATIONS

"14. Initialization and Boot-Mode", (Feb. 24, 2005),36-39.
"15. Boot-Mode", (May 27, 2005),47-53.
"Micron Technology Announces SyncFlash Memory, a New Flash Memory Technology", Press Release,(Nov. 22, 1999),1 page.
"Micron Technology, Inc., Demostrates SyncFlash Memory in Motorola, Intel and Sharp Hardware Reference Platforms", Press Release,(Sep. 23, 2002),1 page.
"SMART Modular Technology, Inc. Launces New SyncFlash/SDRAM SO-DIMM", *SMART Modular Technologies*, (Aug. 5, 2002),3 pages.
"SyncFlash Memory Datasheet", Micron Technology,(2002),59 pages.

* cited by examiner

*Primary Examiner*—Hyung S Sough
*Assistant Examiner*—Hamdy S Ahmed
(74) *Attorney, Agent, or Firm*—Lee & Hayes, PLLC

(57) ABSTRACT

In accordance with a universal nonvolatile memory boot mode, one or more portions of boot code are obtained from a nonvolatile memory component. These one or more portions are obtained without knowing a row size used by the nonvolatile memory component, a column address strobe (CAS) latency used by the nonvolatile memory component, or a default burst length used by the nonvolatile memory component. The one or more portions of boot code are executed to configure the system to access a volatile memory component, and/or to reconfigure the system to access the nonvolatile memory in a different mode of operation.

26 Claims, 5 Drawing Sheets

UNIVERSAL NONVOLATILE MEMORY BOOT MODE

BACKGROUND

Computing devices typically employ two types of memory: volatile memory and nonvolatile memory. Volatile memory refers to memory that needs to be supplied with power in order to maintain its state. If such power is not supplied to the volatile memory, the volatile memory loses its state—any data and/or instructions stored in the volatile memory is lost. Nonvolatile memory refers to memory that does not need to be supplied with power in order to maintain its state. Once data and/or instructions are written to the nonvolatile memory, such data and/or instructions are maintained in the nonvolatile memory regardless of whether power is supplied to the nonvolatile memory.

Typically, two different memory controllers are included in a computing device—one controlling the volatile memory and another controlling the nonvolatile memory. In light of the many different types and configurations of volatile memory, the memory controller controlling the volatile memory typically needs to be configured in a particular way in order to allow the memory controller to control the volatile memory. This configuration of the volatile memory controller is typically performed by executing instructions obtained from the nonvolatile memory by the nonvolatile memory controller.

BRIEF DESCRIPTION OF THE DRAWINGS

The same numbers are used throughout the document to reference like components and/or features.

DETAILED DESCRIPTION

Figure 1:
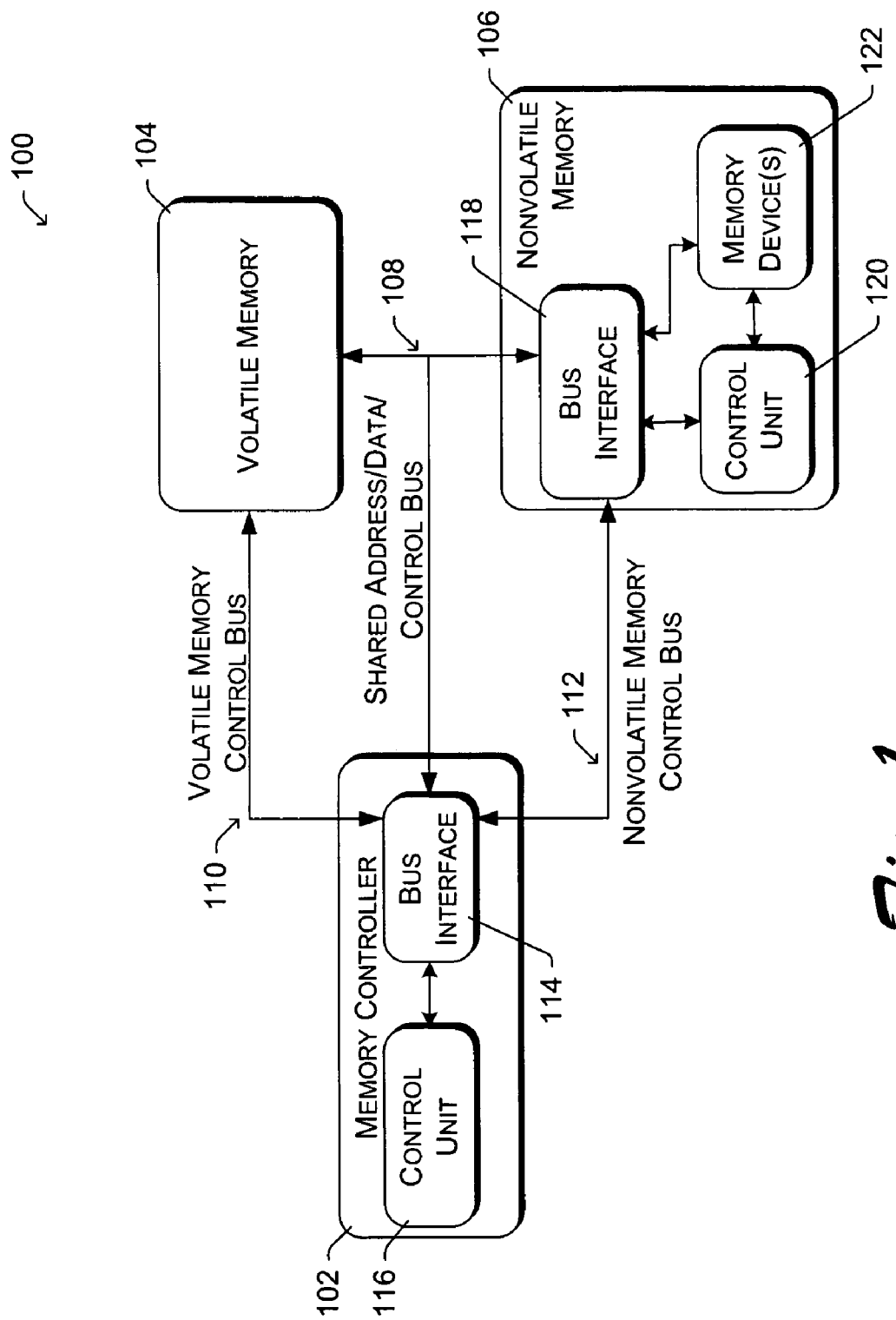
FIG. 1 is a block diagram illustrating an example memory system.

FIG. 1 is a block diagram illustrating an example memory system 100. Memory system 100 includes a memory controller 102 coupled to both a volatile memory component 104, and a nonvolatile memory component 106. A single memory controller 102 controls both volatile memory 104 and nonvolatile memory 106 via a shared address, data and control bus 108. Data to be written to (or read from) memory 104 or 106 can be transferred to (or from) the appropriate memory via bus 108. Additionally, certain control signals can be communicated to memory 104 or 106 via bus 108.

An additional volatile memory control bus 110 also couples memory controller 102 to volatile memory 104 and can be used to communicate control information between memory controller 102 and volatile memory 104. An additional nonvolatile memory control bus 112 couples memory controller 102 to nonvolatile memory 106 and can be used to communicate control information between memory controller 102 and nonvolatile memory 106. Alternatively, separate control busses 110 and 112 may not be present, and all control signals are communicated via shared bus 108. In other alternatives, shared bus 108 may be only a shared data and/or address bus, and all control signals are communicated via control busses 110 and 112.

Each bus 108, 110, and 112 is a collection of one or more communication media via which information can be transferred. Such communication media can be wires via which electrical signals are transferred, or alternatively other media via which other signals (such as optical signals) are transferred. Volatile memory refers to memory that needs to be supplied, at least periodically, with power in order to maintain its state. Volatile memory is typically referred to as random access memory (RAM), such as dynamic random access memory (DRAM), synchronous dynamic random access memory (SDRAM), double data rate SDRAM (DDR SDRAM), static random access memory (SRAM), and so forth. Nonvolatile memory refers to memory that does not need to be supplied with power in order to maintain its state. Nonvolatile memory is typically referred to as read only memory (ROM), such as flash memory, electrically erasable programmable read only memory (EEPROM), and so forth.

Memory controller 102 includes a bus interface 114 and a control unit 116. Control unit 116 implements the booting operations as part of the boot mode protocol for memory controller 102 discussed herein. Control unit 116 may be a hardware component designed to perform such operations, or may be a processor executing software and/or firmware instructions to perform such operations. Bus interface 114 is coupled to various pins of memory controller 102 and asserts the appropriate voltages on those pins as directed by control unit 116, as well as senses the voltages on certain pins as directed by control unit 116.

Nonvolatile memory 106 also includes a bus interface 118, a control unit 120, and memory device(s) 122. Control unit 120 implements the booting operations as part of the boot mode protocol for nonvolatile memory 106 discussed herein. Control unit 120 may be a hardware component designed to perform such operations, or may be a processor executing software and/or firmware instructions to perform such operations. Bus interface 118 is coupled to various pins of nonvolatile memory 106 and asserts the appropriate voltages on those pins as directed by control unit 120, as well as senses the voltages on certain pins as directed by control unit 120. Memory device(s) 122 are the nonvolatile memory storage devices, such as one or more flash memories.

Each time that a computing device in which memory system 100 resides is powered-on, or a reset occurs (e.g., a software or hardware reset), memory system 100 is booted. Generally, during the boot process memory controller 102 retrieves and begins executing boot code from nonvolatile memory 106. Memory controller 102 is able to access a wide variety of different types of nonvolatile memory 106 without any prior knowledge of the particular type of nonvolatile memory 106. Execution of this boot code causes memory controller 102 to configure itself to be able to access volatile memory 104, allowing memory controller 102 to control volatile memory 104 as well as nonvolatile memory 106.

The boot code can cause memory controller 102 to perform any of a variety of configuration operations. In certain embodiments where volatile memory 104 is a DDR SDRAM, the boot code causes memory controller 102 to set configuration registers within memory controller 102 for a data bus width used by volatile memory 104, a row size used by volatile memory 104, Row Address to Column Address Delay (tRCD) latency after an Active command for volatile memory 104, row address strobe (RAS) to RAS Delay Timing (tRRD)

and Minimum Active/Auto-Refresh Time (tRC) restrictions between Active commands for volatile memory 104, a column address strobe (CAS) latency of volatile memory 104, burst length and burst type of volatile memory 104, the output driver strength for the shared data bus, and so forth. In addition, the boot code can cause memory controller 102 to set configuration registers within memory controller 102 for analogous characteristics of nonvolatile memory 106.

Alternatively, rather than a single memory controller 102 controlling both volatile memory 104 and nonvolatile memory 106 as illustrated in FIG. 1, one or more memory controllers may control volatile memory 104, while one or more different memory controllers may control nonvolatile memory 106. The techniques discussed herein remain the same regardless of whether the volatile memory and nonvolatile memory are controlled by a single or multiple different memory controllers. However, it is to be appreciated that if separate memory controllers control the volatile and nonvolatile memories, the boot code can cause the memory controller controlling the volatile memory to be configured, and/or the memory controller controlling the nonvolatile memory to be reconfigured.

Figure 2:
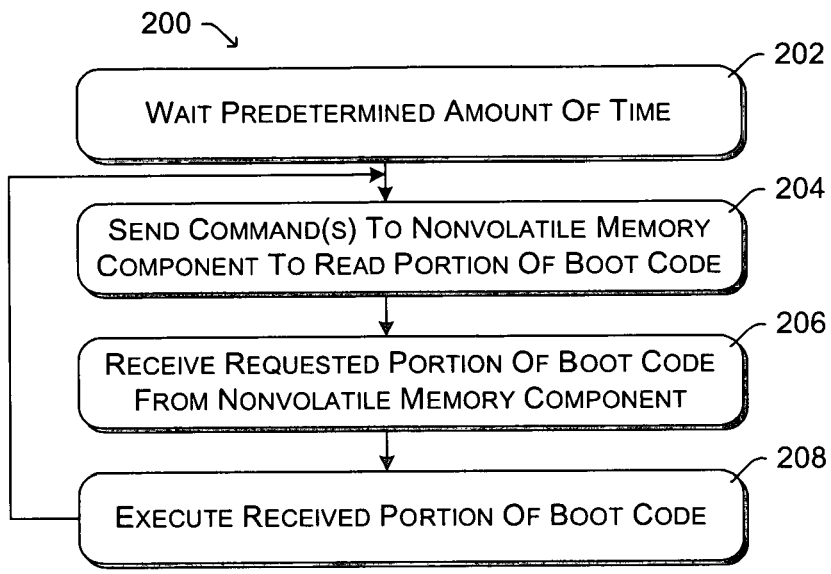
FIG. 2 is a flowchart illustrating an example universal nonvolatile memory boot mode process.

FIG. 2 is a flowchart illustrating an example universal nonvolatile memory boot mode process 200. Process 200 is carried out by a memory controller, such as memory controller 102 of FIG. 1.

When power is applied to the memory controller (during powering-on of the memory system), or the memory system is reset, there may be an initial period of instability where the state of the memory controller and other components (such as nonvolatile memory 106 of FIG. 1) is uncertain and/or not stable. The memory controller waits a predetermined amount of time (act 202) to allow itself and other memory components in the memory system to achieve a stable state. The specific amount of time that the memory controller waits in act 202 can vary by implementation, but should be a sufficient amount of time to allow other memory components in the memory system from which boot code will be obtained to achieve a stable state. For example, this amount of time in act 202 can be one second, although shorter or longer amounts of time may alternatively be used.

After the predetermined amount of time has passed, the memory controller sends a series of one or more commands to the nonvolatile memory component to read at least a portion of the boot code from the nonvolatile memory component (act 204). The boot code stored in the nonvolatile memory begins at a particular memory address that is known to the memory controller. The first series of command(s) sent from the memory controller to the nonvolatile memory requests that data be read from that particular memory address. The number of bytes of data read from that particular memory address can vary by implementation. The memory controller receives the requested portion of the boot code from the nonvolatile memory (act 206) and executes the received portion of the boot code (act 208). Acts 204, 206, and 208 are repeated, with additional portions of boot code being requested, received, and executed as appropriate based on the portions of boot code that are executed.

Typically, the boot code indicates that operation in the boot mode is no longer necessary as soon as the memory controller is configured to control the volatile memory in the memory system as well as the nonvolatile memory according to the same protocol as the volatile memory. This can include, for example, operating at a faster clock speed than is used during the boot mode described by process 200. Once the nonvolatile memory component is no longer operating in the boot mode, it begins operating in accordance with the same protocol that the volatile memory will be operating in accordance with (e.g., the DDR SDRAM protocol).

Figure 3:
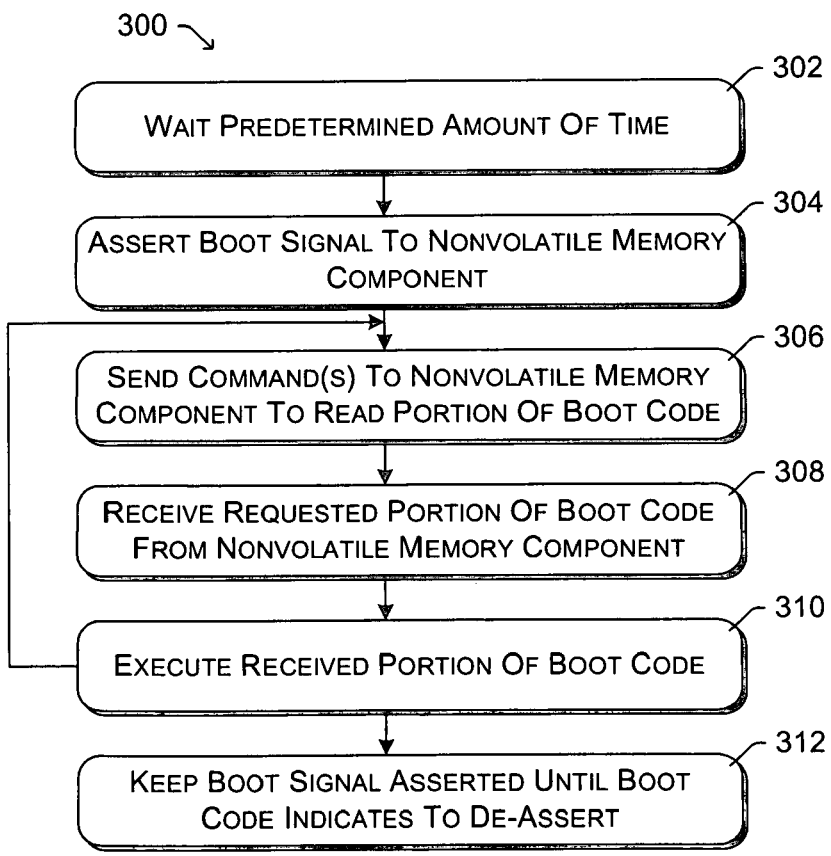
FIG. 3 is a flowchart illustrating another example universal nonvolatile memory boot mode process.

FIG. 3 is a flowchart illustrating another example universal nonvolatile memory boot mode process 300. Process 300 is carried out by a memory controller, such as memory controller 102 of FIG. 1.

Initially, the memory controller waits a predetermined amount of time (act 302), analogous to act 202 of FIG. 2. After the predetermined amount of time has passed, the memory controller asserts a boot signal to the nonvolatile memory component from which the boot code will be read (act 304). Assertion of this boot signal indicates to the nonvolatile memory component that the nonvolatile memory component is to operate in a boot mode rather than the normal mode it would operate in as a component residing on the same bus as the volatile memory component (e.g., shared bus 108 of FIG. 1).

After the boot signal is asserted, the memory controller sends a series of one or more commands to the nonvolatile memory component to read at least a portion of the boot code from the nonvolatile memory component (act 306), analogous to act 204 of FIG. 2. The memory controller receives the requested portion of the boot code from the nonvolatile memory (act 308), analogous to act 206 of FIG. 2. The memory controller then executes the received portion of the boot code (act 310), analogous to act 208 of FIG. 2. Acts 306, 308, and 310 are repeated, with additional portions of boot code being requested, received, and executed as appropriate based on the portions of boot code that are executed.

The memory controller keeps asserting the boot signal until the boot code being executed in act 310 indicates to de-assert the boot signal (act 312). Typically, the boot code indicates that operation in the boot mode is no longer necessary as soon as the memory controller is configured to control the volatile memory in the memory system as well as the nonvolatile memory according to the same protocol as the volatile memory. Alternatively, the boot code may indicate that operation of the boot mode is no longer necessary at other times. Once the nonvolatile memory component is no longer operating in the boot mode, it begins operating in accordance with the same protocol that the volatile memory will be operating in accordance with (e.g., the DDR SDRAM protocol).

Figure 4:
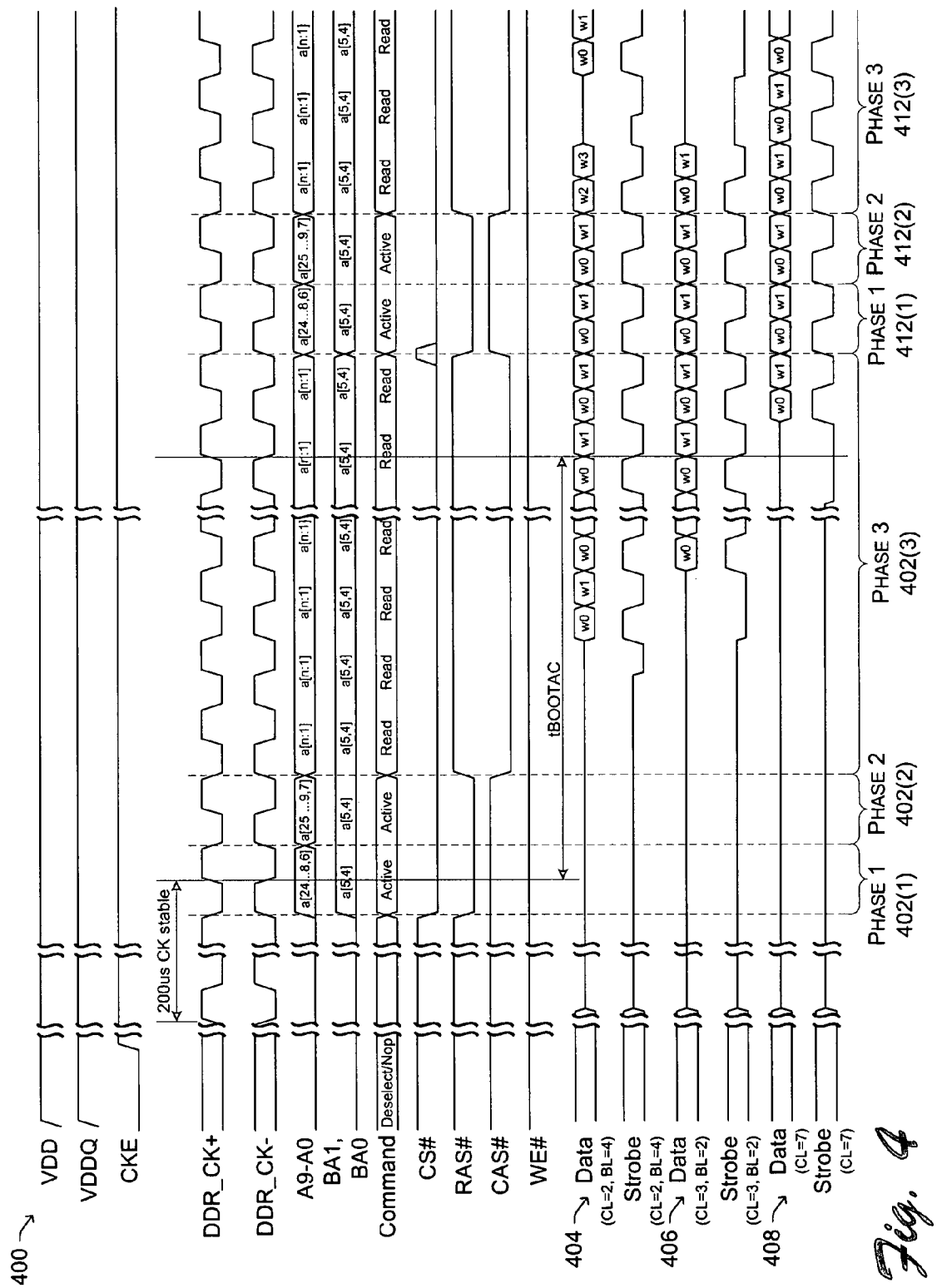
FIG. 4 is a timing diagram illustrating an example boot mode protocol for booting a memory system.
Figure 5:
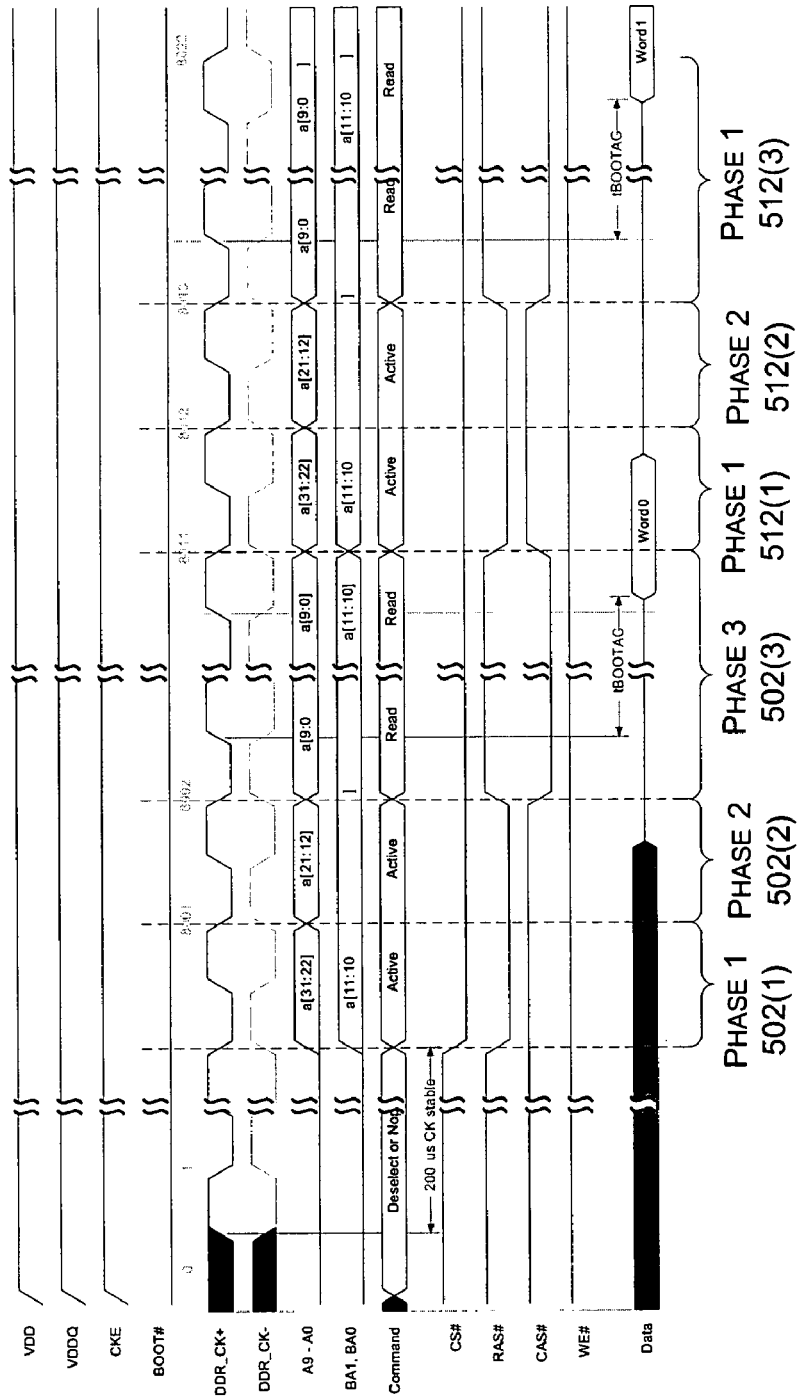
FIG. 5 is a timing diagram illustrating another example boot mode protocol for booting a memory system.

In processes 200 and 300 of FIGS. 2 and 3, the memory controller can make requests from the nonvolatile memory without knowing the exact manner in which the nonvolatile memory is configured. The boot mode protocol used by the memory controller and nonvolatile memory in process 200 and 300 is flexible, supporting a wide variety of different nonvolatile memory configurations without requiring the memory controller to have knowledge of the specific nonvolatile memory configuration. For example, addresses are communicated from the memory controller to the nonvolatile memory in such a manner that the row size used by the nonvolatile memory component need not be known by the memory controller. Specific examples of how addresses can be communicated are illustrated in FIGS. 4 and 5 below. By way of additional example, the memory controller does not need any knowledge of the CAS latency of the nonvolatile memory component or of the default burst length used by the nonvolatile memory component.

FIG. 4 is a timing diagram 400 illustrating an example boot mode protocol for booting a memory system. Timing diagram 400 illustrates the signals that are asserted on particular pins of the memory controller and the nonvolatile memory component, and/or sensed on (also referred to as latched in on) particular pins of the memory controller and the nonvolatile memory component. These pins of the memory controller and nonvolatile memory component are coupled to one another and/or other components via a bus (e.g., one of busses 108, 110, or 112 of FIG. 1). When operating in the boot mode, the nonvolatile memory operates according to the protocol illustrated in FIG. 4, rather than the protocol that the volatile memory will be operating in (e.g., in accordance with the DDR SDRAM protocol).

In the boot mode protocol illustrated by timing diagram 400, three phases are used to transfer an address from the memory controller to the nonvolatile memory and to transfer two data words (for example, four bytes total if the data bus width provides 2 bytes per data word, although other data bus widths can be implemented) from the nonvolatile memory to the memory controller. In each of these three phases, the memory controller asserts a portion of the address on certain address pins and bank address pins, and asserts either an Active command or a Read command on other pins. In the example of FIG. 4, a 25-bit address is transferred from the memory controller to the nonvolatile memory. The nonvolatile memory responds to receipt of these commands and the address by returning the data word located at that address, as well as the data word located at the following address.

Both the memory controller and the nonvolatile memory have ten address pins (A9-A0), two bank address pins (BA1, BA0), a chip select pin (CS#), a row address strobe pin (RAS#), a column address strobe pin (CAS#), a write enable pin (WE#), 16 data pins (Data, although different data widths can be implemented), a memory clock pin (DDR_CK+), a complement memory clock pin (DDR_CK−), and one or more data strobe pin(s) (Strobe). In certain implementations, the following pins are included as part of the shared bus 108 of FIG. 1: A9-A0, BA1, BA0, RAS#, CAS#, WE#, Data, and Strobe. The DDR_CK+, DDR_CK−, and CS# pins are part of the nonvolatile memory control bus 112 of FIG. 1. Additional chip select and memory clock pins are included as part of the volatile memory control bus 110 of FIG. 1 (although these pins are not illustrated in timing diagram 400).

During an initial stabilization period after being powered-on or otherwise reset, the core power supply in the device that includes the memory system (shown as VDD in timing diagram 400) and the Input/Output (I/O) power supply in the device (shown as VDDQ in timing diagram 400) become stabilized. After the power or voltage supply is stabilized, a clock enable signal (CKE) is driven to a high voltage and the memory controller generates and asserts a memory clock signal on DDR_CK+, as well as a complement memory clock signal on DDR_CK−. The memory controller begins asserting a Deselect or No Operation (Nop) command by driving a high voltage on the CS#, RAS#, CAS#, and WE# pins as soon as possible to avoid accidentally requesting the nonvolatile memory to perform some action (such as reading or writing data).

After waiting a predetermined amount of time (e.g., 200 microseconds) for the other components in the memory system (particularly the nonvolatile memory component) to become stabilized, the memory controller asserts an Active command and certain portions of the address in phase 1 402(1). The Active command is asserted by driving a low voltage on the CS# and the RAS# pins, and a high voltage on the CAS# and WE# pins. Of the 25 bits of the address, bits 24, 22, 20, 18, 16, 14, 12, 10, 8, and 6 are asserted on pins A9, A8, A7, A6, A5, A4, A3, A2, A1, and A0, respectively, while bits 5 and 4 are asserted on pins BA1 and BA0, respectively. Phase 1 402(1) lasts one clock cycle, and the nonvolatile memory senses the Active command and the address bits on the rising edge of the clock cycle in phase 1 402(1).

Immediately following phase 1 402(1) is phase 2 402(2). In phase 2 402(2), the memory controller asserts an Active command and additional portions of the address. As in phase 1 402(1), the Active command is asserted by driving a low voltage on the CS# and the RAS# pins, and a high voltage on the CAS# and WE# pins. Of the 26 bits of the address, bits 25, 23, 21, 19, 17, 15, 13, 11, 9, and 7 are asserted on pins A9, A8, A7, A6, A5, A4, A3, A2, A1, and A0, respectively, while bits 5 and 4 are asserted on pins BA1 and BA0, respectively. Phase 2 402(2) lasts one clock cycle, and the nonvolatile memory senses the Active command and the address bits on the rising edge of the clock cycle in phase 2 402(2).

Immediately following phase 2 402(2) is phase 3 402(3). In phase 3 402(3), the memory controller asserts a Read command and additional portions of the address. The same Read command and portions of the address are asserted during all clock cycles in phase 3 402(3). The Read command is asserted by driving a low voltage on the CS# and CAS# pins, and a high voltage on the RAS# and WE# pins. Of the 26 bits of the address, bits 10, 9, 8, 7, 6, 5, 4, 3, 2, and 1 are asserted on pins A9, A8, A7, A6, A5, A4, A3, A2, A1, and A0, respectively, while bits 5 and 4 are asserted on pins BA1 and BA0, respectively. The Read command is sent immediately after the previous Active command (e.g., in the next clock cycle), and is sent without regard for any Row Address to Column Address Delay (tRCD) latency of the nonvolatile memory. The nonvolatile memory senses the Read command and the address bits on the rising edge of the first clock cycle in phase 3 402(3). After sensing the Read command and these address bits, the nonvolatile memory now has all of the address bits and responds to the Read command by retrieving the data at the address received during the three phases, and asserts that data on the Data pins.

It should be noted that in certain embodiments the nonvolatile memory need not wait until the final address bits and Read command are received in phase 3 402(3) in order to begin accessing the data at the address being received from the memory controller. For example, the nonvolatile memory may begin accessing the data based on the address portions received in phase 1 402(1) and/or phase 2 402(2) (without necessarily knowing if it will be reading, writing, or erasing that data, based on the command and partial-address received later in phase 3 402(3)).

According to the boot mode protocol illustrated by timing diagram 400, the nonvolatile memory will assert the requested data on the Data pins so that the memory controller can sense the requested data on the next rising data strobe signal asserted on the Strobe pin by the nonvolatile memory after a predetermined amount of time lapses. This predetermined amount of time is referred to in timing diagram 400 as tBOOTAC, and the specific amount of time can vary. This predetermined amount of time is a value that it is expected most, if not all, nonvolatile memory components can satisfy (e.g., a time within which the nonvolatile memory components can obtain the requested data and assert it on the Data pins). In certain implementations, this predetermined amount of time is 150 or 200 microseconds, although smaller or larger amounts of time may alternatively be used.

The memory controller does not attempt to sense the data on the Data pins until the first rising edge of the data strobe signal on the Strobe pin following tBOOTAC, as the memory controller cannot be assured that any signals on the Data pins represent the actual data until tBOOTAC has passed. The nonvolatile memory asserts two data words on the Data pins in phase 3 402(3)—one data word is asserted by the nonvolatile memory and sensed by the memory controller on the rising edge of the data strobe signal on the Strobe pin, after which the second data word is asserted by the nonvolatile memory and sensed by the memory controller on the falling edge of the data strobe signal on the Strobe pin. Thus, two data words are burst across the data bus to the memory controller in response to, the Read command.

As illustrated in timing diagram 400, the memory controller asserts a low voltage on the CS# pin until both data words are sensed from the nonvolatile memory. After both data words are sensed, the memory controller temporarily asserts a high voltage on the CS# pin (e.g., during the falling edge of the memory clock signal after the second of the two data words is sensed). In alternate embodiments, the memory controller does not temporarily assert a high voltage on the CS# pin, but keeps asserting a low voltage on the CS# pin as part of the boot mode protocol.

It should be noted that different nonvolatile memory components may have different burst lengths (BLs) and different CAS latencies (CLs). Three different nonvolatile memory components are illustrated in timing diagram 400 as Data/Strobe pins 404, Data/Strobe pins 406, and Data/Strobe pins 408. Data/Strobe pins 404 represent a nonvolatile memory having a CAS latency of 2 and a burst length of 4. The nonvolatile memory has the data asserted on the Data pins prior to tBOOTAC expiring, but the memory controller still does not sense the data on the Data pins until the rising edge of the data strobe signal on the Strobe pin after tBOOTAC expires. Additionally, although the nonvolatile memory has a burst length of 4, the nonvolatile memory truncates the current delivery of the four burst words in response to each new Read command. So, two data words are asserted by the nonvolatile memory, but the nonvolatile memory receives another similar Read command, so it re-asserts those two data words rather than the final two of the four burst words. It should be noted that the final two of the four burst words are asserted by the nonvolatile memory after the first two words are sensed by the memory controller because the memory controller asserts an Active command after the sequence of Read commands, so there is no Read command to cause the nonvolatile memory to truncate the four-word burst. However, these final two of the four burst words are not sensed by the memory controller.

Data/Strobe pins 406 represent a nonvolatile memory having a CAS latency of 3 and a burst length of 2. The nonvolatile memory has the data asserted on the Data pins prior to tBOOTAC expiring, but the memory controller still does not sense the data on the Data pins until the rising edge of the data strobe signal on the Strobe pin after tBOOTAC expires.

Data/Strobe pins 408 represent a nonvolatile memory having a CAS latency of 7 and a burst length of 2. The nonvolatile memory does not have the data asserted on the Data pins prior to tBOOTAC expiring, but does have the data asserted on the Data pins on the rising edge of the data strobe signal on the Strobe pin after tBOOTAC expires.

After the three phases 402(1), 402(2), and 402(3) are finished, additional data is read via three additional phases 412(1), 412(2), and 412(3). Phases 412(1), 412(2), and 412(3) are the same as phases 402(1), 402(2), and 402(3), except for the address that is asserted by the memory controller and the data that is returned by the nonvolatile memory are typically different.

The data asserted by the nonvolatile memory to the memory controller on the Data pins is the data for the boot code referred to in act 206 of FIG. 2. For example, each portion of boot code referred to in act 206 can be one (or alternatively two) data words asserted by the nonvolatile memory on the Data pins. Additional sets of the three phases are repeated for each portion of boot code read by the memory controller in process 200 of FIG. 2.

As discussed above, address bit 5 is placed on the BA1 pin, and address bit 4 is placed on the BA0 pin. Depending on the row size used by the particular nonvolatile memory component, address bits 5 and 4 may represent Bank Address bits or Row Address bits or Column Address bits. However, the memory controller need not be concerned with what address bits 5 and 4 represent to the nonvolatile memory component. The nonvolatile memory component knows what address bits 5 and 4 represent, and also knows that according to the boot mode protocol the memory controller will always place address bits 5 and 4 on pins BA1 and BA0, so the nonvolatile memory component can obtain address bits 5 and 4 and use them appropriately. The memory controller can work universally with a variety of different nonvolatile memory components without regard for, or knowledge of, the row size used by those nonvolatile memory components.

The boot mode protocol illustrated by timing diagram 400 also eliminates dependencies on other characteristics of the nonvolatile memory, allowing the memory controller to obtain boot code from the nonvolatile memory without knowledge of these other characteristics. For example, differences in default burst length, CAS latency, tRRD restrictions, tRC restrictions, and so forth among different nonvolatile memory components can be safely ignored by the memory controller by using the boot mode protocol illustrated by timing diagram 400. The memory controller can work universally with a variety of different nonvolatile memory components without regard for these characteristics of those nonvolatile memory components.

Although the boot mode protocol illustrated by timing diagram 400 is discussed as transferring two data words from the nonvolatile memory to the memory controller every three phases, alternatively different amounts of data may be transferred every three phases. For example, rather than transferring two data words, only a single data word may be transferred, or three or more data words may be transferred. Additionally, a smaller (or larger) number of pins on the memory controller and the nonvolatile memory may be used to transfer a smaller (or larger) number of data bits concurrently.

FIG. 5 is a timing diagram 500 illustrating another example boot mode protocol for booting a memory system. Timing diagram 500 illustrates the signals that are asserted on particular pins of the memory controller and nonvolatile memory component, and/or sensed on (also referred to as latched in on) particular pins of the memory controller and nonvolatile memory component. These pins of the memory controller and nonvolatile memory component are coupled to one another and/or other components via a bus (e.g., one of busses 108, 110, or 112 of FIG. 1).

Timing diagram 500 is similar to timing diagram 400 of FIG. 4, but includes an additional boot pin (BOOT#) that is asserted by the memory controller to indicate when the nonvolatile memory is to operate in a boot mode.

In the boot mode protocol illustrated by timing diagram 500, three phases are used to transfer an address from the memory controller to the nonvolatile memory and to transfer one data word (for example, two bytes total) from the nonvolatile memory to the memory controller. In each of these three phases, the memory controller asserts a portion of the address on certain address pins and bank address pins, and asserts either an Active command or a Read command on other pins. In the example of FIG. 5, a 32-bit address is transferred from the memory controller to the nonvolatile memory. The nonvolatile memory responds to receipt of these commands and the address by returning the data word located at that address.

Both the memory controller and the nonvolatile memory have ten address pins (A9-A0), two bank address pins (BA1, BA0), a chip select pin (CS#), a row address strobe pin (RAS#), a column address strobe pin (CAS#), a write enable pin (WE#), 16 data pins (Data), a memory clock pin (DDR_CK+), and a complement memory clock pin (DDR_CK−). In certain implementations, the following pins are included as part of the shared bus 108 of FIG. 1: A9-A0, BA1, BA0, RAS#, CAS#, WE#, and Data. The DDR_CK+, DDR_CK−, and CS# pins are part of the nonvolatile memory control bus 112 of FIG. 1. Additional chip select and memory clock pins are included as part of the volatile memory control bus 110 of FIG. 1 (although these pins are not illustrated in timing diagram 500).

During an initial stabilization period after being powered-on or otherwise reset, the core power supply in the device that includes the memory system (shown as VDD in timing diagram 500) and the Input/Output (I/O) power supply in the device (shown as VDDQ in timing diagram 500) become stabilized. After the power or voltage supply is stabilized, a clock enable signal (CKE) becomes stabilized and the memory controller generates and asserts a memory clock signal on DDR_CK+, as well as a complement memory clock signal on DDR_CK−. The memory controller begins asserting a Deselect or No Operation (Nop) command by driving a high voltage on the CS#, RAS#, CAS#, and WE# pins as soon as possible to avoid accidentally requesting the nonvolatile memory to perform some action (such as reading or writing data).

The memory controller begins asserting a low voltage on the BOOT# pin to indicate to the nonvolatile memory that the nonvolatile memory should operate in the boot mode. When operating in the boot mode, the nonvolatile memory operates according to the protocol illustrated in FIG. 5, rather than the protocol that the volatile memory will be operating in (e.g., in accordance with the DDR SDRAM protocol). Although the memory controller begins asserting a low voltage on the BOOT# pin as early as it can, it cannot be certain of doing so during the entirety of the initial stabilization period.

After waiting a predetermined amount of time (e.g., 200 microseconds) for the other components in the memory system (particularly the nonvolatile memory component) to become stabilized, the memory controller asserts an Active command and certain portions of the address in phase 1 502(1). The Active command is asserted by driving a low voltage on the CS# and the RAS# pins, and a high voltage on the CAS# and WE# pins. Of the 32 bits of the address, bits 31, 30, 29, 28, 27, 26, 25, 24, 23, and 22 are asserted on pins A9, A8, A7, A6, A5, A4, A3, A2, A1, and A0, respectively, while bits 11 and 10 are asserted on pins BA1 and BA0, respectively. Phase 1 502(1) lasts one clock cycle, and the nonvolatile memory senses the Active command and the address bits on the rising edge of the clock cycle in phase 1 502(1).

Immediately following phase 1 502(1) is phase 2 502(2). In phase 2 502(2), the memory controller asserts an Active command and additional portions of the address. As in phase 1 502(1), the Active command is asserted by driving a low voltage on the CS# and the RAS# pins, and a high voltage on the CAS# and WE# pins. Of the 32 bits of the address, bits 21, 20, 19, 18, 17, 16, 15, 14, 13, and 12 are asserted on pins A9, A8, A7, A6, A5, A4, A3, A2, A1, and A0, respectively, while bits 11 and 10 are asserted on pins BA1 and BA0, respectively. Phase 2 502(2) lasts one clock cycle, and the nonvolatile memory senses the Active command and the address bits on the rising edge of the clock cycle in phase 2 502(2).

Immediately following phase 2 502(2) is phase 3 502(3). In phase 3 502(3), the memory controller asserts a Read command and additional portions of the address. The same Read command and portions of the address are asserted during all clock cycles in phase 3 502(3). The Read command is asserted by driving a low voltage on the CS# and CAS# pins, and a high voltage on the RAS# and WE# pins. Of the 32 bits of the address, bits 9, 8, 7, 6, 5, 4, 3, 2, 1, and 0 are asserted on pins A9, A8, A7, A6, A5, A4, A3, A2, A1, and A0, respectively, while bits 11 and 10 are asserted on pins BA1 and BA0, respectively. The Read command is sent immediately after the previous Active command (e.g., in the next clock cycle), and is sent without regard for any Row Address to Column Address Delay (tRCD) latency of the nonvolatile memory. The nonvolatile memory senses the Read command and the address bits on the rising edge of the first clock cycle in phase 3 502(3). After sensing the Read command and these address bits, the nonvolatile memory now has all of the address bits and responds to the Read command by retrieving the data at the address received during the three phases, and asserts that data on the Data pins.

It should be noted that in certain embodiments the nonvolatile memory need not wait until the final address bits and Read command are received in phase 3 502(3) in order to begin accessing the data at the address being received from the memory controller. For example, the nonvolatile memory may begin accessing the data based on the address portions received in phase 1 502(1) and/or phase 2 502(2) (without necessarily knowing if it will be reading, writing, or erasing that data, based on the command and partial-address received later in phase 3 502(3) ).

According to the boot mode protocol illustrated by timing diagram 500, the nonvolatile memory will assert the requested data on the Data pins so that the memory controller can sense the requested data on the next rising edge of the memory clock signal on the DDR_CK+ pin after a predetermined amount of time lapses. This predetermined amount of time is referred to in timing diagram 500 as tBOOTAC, and the specific amount of time can vary. This predetermined amount of time is a value that it is expected most, if not all, nonvolatile memory components can satisfy (e.g., a time within which the nonvolatile memory components can obtain the requested data and assert it on the Data pins). In certain implementations, this predetermined amount of time is 150 or 200 microseconds, although smaller or larger amounts of time may alternatively be used.

The memory controller does not attempt to sense the data on the Data pins until the first rising edge of the memory clock signal on the DDR_CK+ pin following tBOOTAC, as the memory controller cannot be assured that any signals on the Data pins represent the actual data until tBOOTAC has passed. The nonvolatile memory asserts a single data word on the Data pins in phase 3 502(3)—the data word at the address location sent to the nonvolatile memory by the memory controller.

After the three phases 502(1), 502(2), and 502(3) are finished, additional data is read via three additional phases 512 (1), 512(2), and 512(3). Phases 512(1), 512(2), and 512(3) are the same as phases 502(1), 502(2), and 502(3), except for the address that is asserted by the memory controller and the data that is returned by the nonvolatile memory are typically different. Analogous to the discussion above regarding FIG. 4, the data asserted by the nonvolatile memory to the memory controller on the Data pins is the data for the boot code referred to in act 308 of FIG. 3. Additional sets of three phases can be repeated until the boot code indicates that the boot signal is to be de-asserted, at which time a high voltage is asserted on the BOOT# pin indicating to the nonvolatile memory component that it is to exit the boot mode operation.

As discussed above, address bit 11 is placed on the BA1 pin, and address bit 10 is placed on the BA0 pin. Depending on the row size used by the particular nonvolatile memory component, address bits 11 and 10 may represent Bank Address bits or Row Address bits or Column Address bits. However, the memory controller need not be concerned with what address bits 11 and 10 represent to the nonvolatile memory component. The nonvolatile memory component knows what address bits 11 and 10 represent, and also knows that according to the boot mode protocol the memory controller will always place address bits 11 and 10 on pins BA1 and BA0, so the nonvolatile memory component can obtain address bits 11 and 10 and use them appropriately. The memory controller can work universally with a variety of different nonvolatile memory components without regard for, or knowledge of, the row size used by those nonvolatile memory components.

The boot mode protocol illustrated by timing diagram 500 also eliminates dependencies on other characteristics of the nonvolatile memory, allowing the memory controller to obtain boot code from the nonvolatile memory without knowledge of these other characteristics. For example, differences in default burst length, CAS latency, tRRD restrictions, tRC restrictions, and so forth among different nonvolatile memory components can be safely ignored by the memory controller by using the boot mode protocol illustrated by timing diagram 500. The memory controller can work universally with a variety of different nonvolatile memory components without regard for these characteristics of those nonvolatile memory components.

Although the boot mode protocols illustrated by timing diagrams 400 and 500 are discussed as using three phases to transfer an address from the memory controller to the nonvolatile memory, alternatively a smaller (or larger) number of phases may be used. For example, a smaller number of phases may be used if the number of address pins on the memory controller and the nonvolatile memory are increased so that the entire address can be separated into two pieces rather than three. By way of another example, a larger number of phases may be used if the number of address pins on the memory controller and the nonvolatile memory are decreased and the address is separated into four or more pieces. By way of still another example, a larger (or smaller) number of phases may be used if the number of address pins on the memory controller and the nonvolatile memory stays the same, but the amount of memory increases (or decreases), thereby increasing (or reducing) the number of bits needed to represent an address.

It should also be noted that, in order to support the tBOOTAC time used in the boot mode protocols of FIGS. 4 and 5, other timing values supported by the nonvolatile memory and/or memory controller may need to be modified. The specific values, as well as whether they need to be modified, can vary by implementation and the specific characteristics of the nonvolatile memory and/or memory controller. For example, the RAS to RAS Delay Timing (tRRD) and the Minimum Active/Auto-Refresh Time (tRC) may be adjusted during operation of the boot mode protocol to be equal to tBOOTAC.

Additionally, it should be noted that FIGS. 4 and 5 are discussed with reference to asserting a low voltage or a high voltage on various pins. Any of a variety of voltages can be used for a low voltage, such as values ranging from 0.0 to 0.5 volts for a low voltage, and ranging from 1.8 to 5.5 volts for a high voltage. Additionally, it should be noted that the boot mode protocols discussed with reference to FIGS. 4 and 5 can be implemented where the opposite voltage is asserted rather than the voltage discussed above (e.g., in discussions of asserting a low voltage on the CS# pin, a high voltage could alternatively be asserted).

Furthermore, it should be noted that FIGS. 4 and 5 are discussed with reference to particular values being sensed on the rising or falling edge of a signal. Such values could alternatively be sensed on the other edge of the signal (e.g., in discussions of sensing address bits on the rising edge of the memory clock cycle, the address bits could alternatively be sensed on the falling edge of the memory clock cycle).

In addition, it should be noted that the particular address bits discussed with reference to FIGS. 4 and 5 as being asserted on particular address pins are only examples, and that different mappings may be used. For example, rather than bits 24, 22, 20, 18, 16, 14, 12, 10, 8, and 6 being asserted on pins A9, A8, A7, A6, A5, A4, A3, A2, A1, and A0, respectively, in phase 1 402(1) of FIG. 4, bits 6, 8, 10, 12, 14, 16, 18, 20, 22, and 24 may be asserted on pins A9, A8, A7, A6, A5, A4, A3, A2, A1, and A0, respectively.

Figure 6:
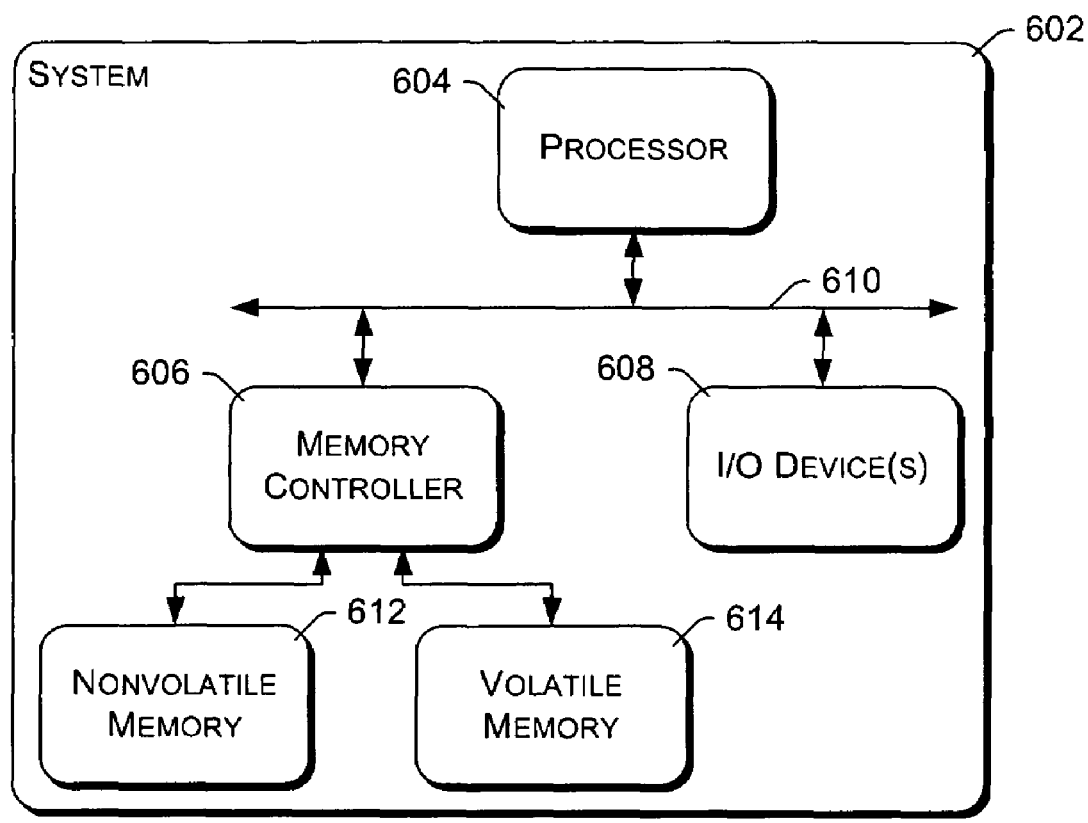
FIG. 6 is a block diagram illustrating an example system in which the universal nonvolatile memory boot mode described herein can be implemented.

FIG. 6 is a block diagram illustrating an example system 602 in which the universal nonvolatile memory boot mode described herein can be implemented. System 602 represents any of a wide variety of computing devices, such as desktop computers, server computers, portable or notebook computers, handheld computers or personal digital assistants (PDAs), set-top boxes, game consoles, and so forth. System 602 includes a processor 604 coupled to a memory controller 606 and one or more Input/Output (I/O) device(s) 608 via one or more busses 610. Although only one processor 604 and one memory controller 606 are illustrated in FIG. 6, system 602 may alternatively include two or more processors 604 of the same or different types, and/or two or more memory controllers 606 of the same or different types.

I/O devices 608 represent any of a variety of input and/or output devices, such as displays, keyboards, cursor control devices, mass storage devices (e.g., magnetic or optical disks and/or disk drives), hard copy devices such as printers, and so forth. Bus 610 represents any one or more of a variety of different busses operating in accordance with any of a variety of different proprietary and/or public bus protocols, and can be a processor bus or a peripheral device bus. For example, one or more busses 610 could operate in accordance with one of the Universal Serial Bus (USB) protocols, such as the Universal Serial Bus Revision 2.0 specification, published Apr. 27, 2000, or in accordance with any of a variety of other peripheral device bus protocols.

Memory controller 606 is coupled to, and controls, one or both of a nonvolatile memory component 612 and a volatile memory component 614. Memory controller 606 is coupled to nonvolatile memory component 612 and/or volatile memory component via one or more additional busses separate from bus 610. Memory controller 606 can be, for example, memory controller 102 of FIG. 1. Nonvolatile memory component 612 can be, for example, nonvolatile memory 106 of FIG. 1. Volatile memory component 614 can be, for example, volatile memory 104 of FIG. 1. Although illustrated as a separate component in FIG. 6, memory controller 606 may alternatively be incorporated into and be part of another component, such as processor 604.

Although the description above uses language that is specific to structural features and/or methodological acts, it is to be understood that the appended claims are not limited to the specific features or acts described. Rather, the specific features and acts are disclosed as exemplary forms of implementing the universal nonvolatile memory boot mode described herein.

The invention claimed is:

1. A memory controller comprising:
   a bus interface coupled to a nonvolatile memory via a bus; and
   a control unit configured to retrieve boot code from the nonvolatile memory without knowledge of one or more of a row size used by the nonvolatile memory, a column address strobe (CAS) latency used by the nonvolatile memory, or a default burst length used by the nonvolatile memory.

2. A memory controller as recited in claim 1, wherein the one or more of the row size, the CAS latency, and the default burst length comprises all of the row size used by the nonvolatile memory, the CAS latency used by the nonvolatile memory, and the default burst length used by the nonvolatile memory.

3. A memory controller as recited in claim 1, wherein the bus interface further comprises:
   a boot pin, wherein the control unit is configured to have a signal asserted on the boot pin to indicate to the nonvolatile memory that the nonvolatile memory is to operate in a boot mode.

4. A memory controller as recited in claim 1, wherein the bus interface is coupled to both a volatile memory and the nonvolatile memory via the bus.

5. A memory controller as recited in claim 4, wherein the bus is a shared data, address, and control bus.

6. A memory controller as recited in claim 4, wherein the bus is a shared address bus.

7. A memory controller as recited in claim 6, wherein the bus is also a shared control bus.

8. A memory controller as recited in claim 1, wherein the control unit implements a boot mode protocol that causes the memory controller to, for each of a plurality of portions of the boot code to be retrieved:
   send an address to the nonvolatile memory over a plurality of phases; and
   sense data sent by the nonvolatile memory after a predetermined amount of time, at least a portion of the data being stored by the nonvolatile memory at the address.

9. A memory controller as recited in claim 8, wherein the boot mode protocol further causes the memory controller to:
   assert particular bits of the address over bank address pins to allow the nonvolatile memory to use the two bits as bank address bits or row address bits or column address bits.

10. A memory controller as recited in claim 1, wherein the control unit implements a boot mode protocol that causes the memory controller to, for each of a plurality of portions of the boot code to be retrieved:
    send a sequence of commands to the nonvolatile memory, the sequence of commands including an Active command immediately followed by a Read command.

11. A memory controller as recited in claim 10, wherein the Read command is sent without waiting for a Row Address to Column Address Delay (tRCD) latency of the nonvolatile memory.

12. One or more computer readable memory having stored thereon instructions that, when executed by a processor of a system, cause the processor to:
    obtain one or more portions of boot code from a nonvolatile memory component without knowing one or more of a row size used by the nonvolatile memory component, a column address strobe (CAS) latency used by the nonvolatile memory component, or a default burst length used by the nonvolatile memory component; and
    execute the one or more portions of boot code to configure the system to access a volatile memory component.

13. One or more computer readable memory as recited in claim 12, wherein the one or more of the row size, the CAS latency, and the default burst length comprises all of the row size used by the nonvolatile memory component, the CAS latency used by the nonvolatile memory component, and the default burst length used by the nonvolatile memory component.

14. One or more computer readable memory as recited in claim 12, wherein the instructions further cause the processor to:
    assert, prior to obtaining the one or more portions of boot code, a boot signal to indicate that the nonvolatile memory component is to operate in a boot mode;
    execute the one or more portions of boot code until the boot code indicates that the nonvolatile memory component should no longer operate in the boot mode; and
    de-assert, in response to the boot code indicating that the nonvolatile memory component should no longer operate in the boot mode, the boot signal to indicate that the nonvolatile memory component is no longer to operate in the boot mode.

15. One or more computer readable memory as recited in claim 12, wherein:
    the system comprises a memory controller;
    to assert the boot signal is to assert a low voltage on a boot pin of the memory controller; and
    to de-assert the boot signal is to assert a high voltage on the boot pin of the memory controller.

16. One or more computer readable memory as recited in claim 12, wherein execution of the boot code causes the system to be configured to access a volatile memory that shares a data bus with the nonvolatile memory.

17. One or more computer readable memory as recited in claim 12, wherein the system comprises a memory controller.

18. A system comprising:
    a bus;
    a processor coupled to the bus;
    a volatile memory component;
    a nonvolatile memory component; and
    a memory controller coupled to the bus and to both the volatile memory component and the nonvolatile memory component, wherein the memory controller is configured to retrieve boot code from the nonvolatile memory component via an additional bus without any knowledge of one or more of a row size of the nonvolatile memory component, a column address strobe (CAS) latency used by the nonvolatile memory component, or a default burst length used by the nonvolatile memory component.

19. A system as recited in claim 18, wherein the memory controller is coupled to the nonvolatile memory component via the additional bus that is shared with a volatile memory component.

20. A system as recited in claim 18, wherein the one or more of the row size, the CAS latency, and the default burst length comprises all of the row size used by the nonvolatile memory component, the CAS latency used by the nonvolatile memory component, and the default burst length used by the nonvolatile memory component.

21. A system as recited in claim 18, wherein the memory controller further comprises:
    a boot pin, wherein the memory controller is configured to assert a signal on the boot pin to indicate to the nonvolatile memory component that the nonvolatile memory component is to operate in a boot mode.

22. A system as recited in claim 18, wherein the memory controller implements a boot mode protocol that causes the memory controller to, for each of a plurality of portions of the boot code to be retrieved:
    send an address to the nonvolatile memory component over a plurality of phases; and
    sense data sent by the nonvolatile memory component after a predetermined amount of time, at least a portion of the data being stored by the nonvolatile memory component at the address.

23. A system as recited in claim 18, wherein the boot mode protocol further causes the memory controller to:
    assert a particular two bits of the address over two bank address pins to allow the nonvolatile memory component to use the two bits as bank address bits or row address bits or column address bits.

24. A nonvolatile memory component comprising:
    a bus interface coupled to both a volatile memory and a memory controller via a single shared bus, the bus interface further coupled to the memory controller via a boot pin; and
    a control unit configured to obtain data stored in one or more memory devices in response to requests from the memory controller, wherein the control unit is further configured to operate in a boot mode when a boot signal is received via the boot pin, and to operate in accordance with the same protocol as the volatile memory when the boot signal is not received via the boot pin.

25. A nonvolatile memory component as recited in claim 24, wherein the control unit implements a boot mode protocol that causes the nonvolatile memory component to, for each of a plurality of portions of boot code to be sent to the memory controller:
    sense an address from the memory controller over a plurality of phases; and
    return data located at the address to the memory controller within a predetermined amount of time.

26. A nonvolatile memory component as recited in claim 25, wherein the address is sensed via a plurality of address pins and a plurality of bank address pins.

* * * * *